US009568900B2

(12) United States Patent
Potter et al.

(10) Patent No.: US 9,568,900 B2
(45) Date of Patent: Feb. 14, 2017

(54) SYSTEMS AND METHODS FOR REGULATING AN ALTERNATIVE ENERGY SOURCE THAT IS DECOUPLED FROM A POWER GRID

(71) Applicant: OPTERRA ENERGY SERVICES, INC., Los Angeles, CA (US)

(72) Inventors: David Potter, San Francisco, CA (US); Eduardo Alberto Alegria, San Mateo, CA (US); Aaron Mineai, San Francisco, CA (US)

(73) Assignee: OPTERRA ENERGY SERVICES, INC., Overland Park, KS (US)

( * ) Notice: Subject to any disclaimer, the term of this patent is extended or adjusted under 35 U.S.C. 154(b) by 405 days.

(21) Appl. No.: 13/836,376

(22) Filed: Mar. 15, 2013

(65) Prior Publication Data
US 2014/0163754 A1 Jun. 12, 2014

Related U.S. Application Data

(60) Provisional application No. 61/735,788, filed on Dec. 11, 2012.

(51) Int. Cl.
*G05D 7/00* (2006.01)
*G05B 15/02* (2006.01)
(Continued)

(52) U.S. Cl.
CPC .......... *G05B 15/02* (2013.01); *H02J 3/28* (2013.01); *H02J 3/32* (2013.01); *H02J 2003/007* (2013.01);
(Continued)

(58) Field of Classification Search
CPC ....... G05B 15/02; H02J 2003/007; H02J 3/28; H02J 3/32; Y02B 10/30
(Continued)

(56) References Cited

U.S. PATENT DOCUMENTS 816,719 A 4/1906 Fell
1,284,565 A 11/1918 Bennett
(Continued)

FOREIGN PATENT DOCUMENTS

DE 4129492 1/1993
DE 202010001742 5/2010
(Continued)

OTHER PUBLICATIONS

Moncrief "Energy Storage—Applications in the Smart Grid" from "Modern Electric Power Systems 2010, Wroclaw, Poland".*
(Continued)

*Primary Examiner* — Kenneth M Lo
*Assistant Examiner* — Yuhui R Pan
(74) *Attorney, Agent, or Firm* — Bryan Cave LLP

(57) ABSTRACT

A method includes: determining a total power load from an electrical power consumption entity configured to receive all or a portion of the total power load from each of (i) an alternative energy source ("AES"), (ii) a power grid, and (iii) a rechargeable energy storage device. The AES and the power grid are connected using a reverse power relay. The method also includes: for a first time period, determining a first power supply from the AES. The first power supply is affected by natural events that are uncontrolled by a user. The method also includes in accordance with a determination that, during the first time period, the power supply from the AES exceeds the power load: storing an excess portion of the power supply in the energy storage device, without releasing electrical power from the AES to the power grid. The excess portion is less than the energy storage device's maximum capacity.

21 Claims, 7 Drawing Sheets

(51) Int. Cl.
*H02J 3/32* (2006.01)
*H02J 3/28* (2006.01)
*H02J 3/00* (2006.01)

(52) U.S. Cl.
CPC ................ *Y02B 10/30* (2013.01); *Y02E 60/76* (2013.01); *Y02P 80/21* (2015.11); *Y04S 40/22* (2013.01)

(58) Field of Classification Search
USPC ........................................................ 700/287
See application file for complete search history.

(56) References Cited

U.S. PATENT DOCUMENTS

| | | | |
|---|---|---|---|
| 1,812,585 A | 6/1931 | Collins | |
| 1,988,389 A | 1/1935 | Fitzhugh | |
| 2,018,250 A | 10/1935 | Cohan | |
| 2,098,752 A | 11/1937 | Miller | |
| 2,654,147 A | 10/1953 | Wilson et al. | |
| 2,971,736 A | 2/1961 | Ernst | |
| 3,053,359 A | 9/1962 | Stanley | |
| 3,509,674 A | 5/1970 | Birum | |
| 3,557,439 A | 1/1971 | Dykeman | |
| 3,620,846 A | 11/1971 | Paine et al. | |
| 3,643,935 A | 2/1972 | Bell | |
| 3,741,405 A | 6/1973 | McConnell et al. | |
| 3,946,876 A | 3/1976 | Jay | |
| 3,969,863 A | 7/1976 | Alderman | |
| 4,015,653 A | 4/1977 | Slysh et al. | |
| 4,151,872 A | 5/1979 | Slysh et al. | |
| 4,184,476 A | 1/1980 | McArthur | |
| 4,206,748 A | 6/1980 | Goodman et al. | |
| 4,253,224 A | 3/1981 | Hickman et al. | |
| 4,255,910 A | 3/1981 | Wendt | |
| 4,262,809 A | 4/1981 | McConnell | |
| 4,315,163 A | 2/1982 | Bienville | |
| 4,393,859 A | 7/1983 | Marossy et al. | |
| 4,475,296 A | 10/1984 | Fremstad | |
| 4,481,774 A | 11/1984 | Snook | |
| 4,621,472 A | 11/1986 | Kloke | |
| 4,635,413 A | 1/1987 | Hansen et al. | |
| 4,659,072 A | 4/1987 | De La Rosa | |
| 4,909,869 A | 3/1990 | Sakamoto et al. | |
| 4,966,631 A | 10/1990 | Matlin et al. | |
| 5,125,608 A | 6/1992 | McMaster et al. | |
| 5,127,638 A | 7/1992 | Kent | |
| 5,210,685 A | 5/1993 | Rosa | |
| 5,233,931 A | 8/1993 | McCorkle, Jr. | |
| 5,355,575 A | 10/1994 | Self | |
| 5,433,259 A | 7/1995 | Faludy | |
| 5,460,660 A | 10/1995 | Albright et al. | |
| 5,487,471 A | 1/1996 | Marchek et al. | |
| 5,488,810 A | 2/1996 | Horton | |
| 5,499,480 A | 3/1996 | Bass | |
| 5,505,788 A | 4/1996 | Dinwoodie | |
| 5,524,401 A | 6/1996 | Ishikawa et al. | |
| 5,549,287 A | 8/1996 | Loucks | |
| 5,571,338 A | 11/1996 | Kadonome et al. | |
| 5,606,838 A | 3/1997 | Hughes et al. | |
| 5,716,155 A | 2/1998 | Yoshida et al. | |
| 5,741,370 A | 4/1998 | Hanoka | |
| 5,814,904 A | 9/1998 | Galm | |
| D408,554 S | 4/1999 | Dinwoodie | |
| 5,927,138 A | 7/1999 | Richardson | |
| 5,941,035 A | 8/1999 | Purse | |
| 6,058,601 A | 5/2000 | DeKoning | |
| 6,065,255 A | 5/2000 | Stern et al. | |
| 6,082,060 A | 7/2000 | Bauer et al. | |
| 6,155,017 A | 12/2000 | Turner | |
| 6,182,403 B1 | 2/2001 | Mimura et al. | |
| 6,308,489 B1 | 10/2001 | Romes | |
| 6,404,075 B1 | 6/2002 | Potter et al. | |
| 6,465,724 B1 | 10/2002 | Garvison et al. | |
| 6,470,632 B1 | 10/2002 | Smith | |
| 6,541,940 B1 * | 4/2003 | Jungreis | 320/103 |
| 6,654,998 B1 | 12/2003 | Berdan et al. | |
| 6,672,018 B2 | 1/2004 | Shingleton | |
| 6,685,390 B1 | 2/2004 | Eitzen | |
| 6,722,357 B2 | 4/2004 | Shingleton | |
| 7,012,188 B2 | 3/2006 | Erling | |
| 7,102,074 B2 | 9/2006 | Yen et al. | |
| 7,171,793 B2 | 2/2007 | Gordin et al. | |
| 7,230,819 B2 | 6/2007 | Muchow et al. | |
| 7,237,360 B2 | 7/2007 | Moncho et al. | |
| 7,260,918 B2 | 8/2007 | Liebendorfer | |
| 7,487,771 B1 | 2/2009 | Eiffert et al. | |
| 7,531,741 B1 | 5/2009 | Melton et al. | |
| D595,645 S | 7/2009 | Beghelli | |
| 7,557,292 B2 | 7/2009 | Shingleton et al. | |
| 7,600,349 B2 | 10/2009 | Liebendorfer | |
| 7,607,628 B2 | 10/2009 | Elder et al. | |
| 7,743,575 B2 | 6/2010 | Ito | |
| 7,766,292 B2 | 8/2010 | Liebendorfer | |
| 7,774,998 B2 | 8/2010 | Aschenbrenner | |
| 7,807,918 B2 | 10/2010 | Shingleton et al. | |
| 7,810,489 B2 | 10/2010 | Liu et al. | |
| 7,814,899 B1 | 10/2010 | Port | |
| 7,856,769 B2 | 12/2010 | Plaisted et al. | |
| 8,240,109 B2 | 8/2012 | Cusson et al. | |
| 8,256,169 B2 | 9/2012 | Cusson et al. | |
| 8,316,590 B2 | 11/2012 | Cusson | |
| 8,430,372 B2 | 4/2013 | Haddock | |
| 8,453,986 B2 | 6/2013 | Schnitzer | |
| 8,479,459 B2 | 7/2013 | Tucker | |
| 8,584,338 B2 | 11/2013 | Potter | |
| 8,640,400 B2 | 2/2014 | Liebendorfer | |
| 8,657,991 B2 | 2/2014 | Potter et al. | |
| 8,813,440 B2 | 8/2014 | Potter et al. | |
| 8,839,500 B2 | 9/2014 | Potter et al. | |
| 2002/0109411 A1 * | 8/2002 | Potter et al. | 307/64 |
| 2003/0070368 A1 | 4/2003 | Shingleton | |
| 2003/0070705 A1 | 4/2003 | Hayden et al. | |
| 2003/0101662 A1 | 6/2003 | Ullman | |
| 2003/0177706 A1 | 9/2003 | Ullman | |
| 2004/0011354 A1 | 1/2004 | Erling | |
| 2005/0109384 A1 | 5/2005 | Shingleton et al. | |
| 2006/0096635 A1 | 5/2006 | Tuttle | |
| 2006/0171086 A1 | 8/2006 | Hennessy et al. | |
| 2006/0219547 A1 | 10/2006 | Tuttle | |
| 2006/0276938 A1 | 12/2006 | Miller | |
| 2007/0246039 A1 | 10/2007 | Brazier et al. | |
| 2008/0029148 A1 | 2/2008 | Thompson | |
| 2008/0230047 A1 | 9/2008 | Shugar et al. | |
| 2008/0236571 A1 | 10/2008 | Keshner | |
| 2009/0050194 A1 | 2/2009 | Noble et al. | |
| 2009/0140576 A1 | 6/2009 | Yu et al. | |
| 2009/0205703 A1 | 8/2009 | Umotoy et al. | |
| 2009/0223142 A1 | 9/2009 | Shingleton et al. | |
| 2009/0229200 A1 | 9/2009 | Noble et al. | |
| 2009/0230265 A1 | 9/2009 | Newman et al. | |
| 2009/0282755 A1 | 11/2009 | Abbott et al. | |
| 2009/0314327 A1 | 12/2009 | Saha et al. | |
| 2010/0031586 A1 | 2/2010 | Miller | |
| 2010/0073220 A1 | 3/2010 | Olesen et al. | |
| 2010/0077592 A1 | 4/2010 | Casano | |
| 2010/0083954 A1 | 4/2010 | Bartelt-Muszynski | |
| 2010/0108118 A1 | 5/2010 | Luch | |
| 2010/0132768 A1 | 6/2010 | Ito et al. | |
| 2010/0132769 A1 | 6/2010 | Potter et al. | |
| 2010/0163015 A1 | 7/2010 | Potter et al. | |
| 2010/0179704 A1 | 7/2010 | Ozog | |
| 2010/0193260 A1 | 8/2010 | Freeman | |
| 2010/0212722 A1 | 8/2010 | Wares | |
| 2010/0236183 A1 | 9/2010 | Cusson et al. | |
| 2010/0237029 A1 | 9/2010 | Cusson et al. | |
| 2010/0254813 A1 | 10/2010 | Dawson et al. | |
| 2010/0313939 A1 | 12/2010 | Krein et al. | |
| 2010/0317141 A1 | 12/2010 | Krein et al. | |
| 2011/0047931 A1 | 3/2011 | Wallgren | |
| 2011/0058664 A1 | 3/2011 | Prax et al. | |
| 2011/0072740 A1 | 3/2011 | Dieter et al. | |
| 2011/0094559 A1 | 4/2011 | Potter et al. | |
| 2011/0113714 A1 | 5/2011 | Hsu et al. | |

(56) References Cited

U.S. PATENT DOCUMENTS

| | | | |
|---|---|---|---|
| 2011/0138599 A1 | 6/2011 | Bellacicco et al. | |
| 2011/0163603 A1* | 7/2011 | Chou et al. | 307/66 |
| 2011/0198304 A1 | 8/2011 | Wallgren | |
| 2011/0240093 A1 | 10/2011 | Tucker | |
| 2011/0283923 A1 | 11/2011 | Potter | |
| 2011/0284709 A1 | 11/2011 | Potter | |
| 2011/0298292 A1* | 12/2011 | Bremicker et al. | 307/82 |
| 2012/0027550 A1 | 2/2012 | Bellacicco et al. | |
| 2012/0198696 A1 | 8/2012 | Potter | |
| 2012/0229077 A1 | 9/2012 | Tsuchiya | |
| 2013/0122639 A1 | 5/2013 | Degroot et al. | |
| 2014/0076377 A1 | 3/2014 | Hamilton | |
| 2014/0076378 A1 | 3/2014 | Hamilton | |
| 2014/0076383 A1 | 3/2014 | Potter | |
| 2014/0077055 A1 | 3/2014 | Hamilton | |
| 2014/0095076 A1* | 4/2014 | Marwah et al. | 702/3 |
| 2014/0163754 A1 | 6/2014 | Potter et al. | |
| 2014/0163755 A1 | 6/2014 | Potter et al. | |
| 2014/0163756 A1 | 6/2014 | Potter | |
| 2014/0175251 A1 | 6/2014 | Potter | |
| 2014/0265330 A1* | 9/2014 | Carkner | F03D 9/021 290/44 |
| 2015/0203328 A1* | 7/2015 | Horbrugger | B66B 1/302 187/290 |

FOREIGN PATENT DOCUMENTS

| | | |
|---|---|---|
| DE | 102009033946 | 1/2011 |
| DE | 102009040091 | 3/2011 |
| DE | 202011005048 | 10/2011 |
| DE | 102012202465 | 8/2012 |
| EP | 1683728 | 7/2006 |
| EP | 1947019 | 7/2008 |
| EP | 2469238 | 6/2012 |
| EP | 2509180 | 10/2012 |
| WO | 2006053128 | 5/2006 |
| WO | 2008058284 | 5/2008 |
| WO | 2014092821 | 6/2014 |
| WO | 2014092822 | 6/2014 |
| WO | 2014092823 | 6/2014 |

OTHER PUBLICATIONS

New Mexico State University, Eye on Research; Sun-News; NMSU to get solar-powered parking structure, Dec. 11, 2006, p. 6A, also found at: www.werc.net/News/Press%20Releases/IEE20StructureStory.pdf.

Sundial Energy, Inc., ShartShade Solar Parking Structures, preinted Jan. 21, 2010, pp. 1-3, also found at www.sundialenergy.com/su_css_pages/product_shade.html.

David Nagel, Campus Technology, UCSD Plants Solar Trees on Parking Structures, Sep. 9, 2008, pp. 1-3, also found at www.campustechnology.com/Articles/2008/09/UCSD-Plants-Solar-Trees_on_Parking_Structures.aspx.

Justin, for Metaeficient.com, Solar Canopies for Parking Lots, printed Jan. 21, 2010, pp. 1-9, also found at www.metawfficient.com/renewable-power/solar-canopies-for-parking-lots.html.

MBcarc Constructions Inc., Potovoltaic Canopies, Approved Drawing, by California Division of State Architect, Aug. 19, 2009.

Ruey-Hsun Liang et al., A fuzzy-optimization approach for generation scheduling with wind and solar energy systems, IEEE Service Center, 22(4): 1665-1674.

Connecting the Sun—Solar Photovoltaic on the Road to Large-Scale Grid Integration, EPIA, Sep. 12.

Patent Cooperation Treaty, International Search Report for PCT/US2013/057273, dated Mar. 5, 2014, 4 pages.

Patent Cooperation Treaty, International Search Report for PCT/US2013/057273, dated Jan. 7, 2014, 4 pages.

Patent Cooperation Treaty, International Search Report for PCT/US2013/057267, dated Dec. 5, 2013, 3 pages.

Patent Cooperation Treaty, International Search Report for PCT/US2001/001767, dated Apr. 26, 2001, 1 page.

* cited by examiner

SYSTEMS AND METHODS FOR REGULATING AN ALTERNATIVE ENERGY SOURCE THAT IS DECOUPLED FROM A POWER GRID

PRIORITY AND RELATED APPLICATIONS

This application claims priority to U.S. Provisional Patent Application 61/735,788, file Dec. 11, 2012. This application also relates to U.S. Provisional Patent Application Nos. 61/735,776, and 61/735,801, each filed Dec. 11, 2012.

All the above-identified patent applications are hereby incorporated by references in their entireties.

TECHNICAL FIELD

The disclosed implementations relate generally to regulating an alternative energy source that is decoupled from a power grid.

BACKGROUND

Controlling power systems that includes alternative energy sources can be difficult for several reasons.

First, unlike a coal plant, an alternative energy source (e.g., a solar park or a wind farm) is more susceptible to unpredictable events. For example, as a result of an unexpected strong wind, a wind farm in Wyoming may produce twice the electricity originally planned, and the additional electricity may cause a failure to power systems connected to the wind farm unless properly handled. In another example, due to an unforeseeable draught, a hydro-electric station at the Hoover damn may fail to supply enough energy to a nearby city, and the power shortage needs to be dealt with promptly and economically.

Second, energy production by an alternative energy source sometimes needs to be closely monitored. For example, in many arrangements between a utility provider and a utility consumer when the utility consumer is connected to the utility provider's power grid, an alternative energy source is required, legally or contractually, not to cause a reverse power flow to the power grid. This may have an undesirable or unwanted effect on the power grid, as well as on any power systems connected thereto.

Given the above background, there is clearly a need in the art for systems and methods that can regulate an alternative energy source that is decoupled from a power grid.

SUMMARY

The above identified difficulties are reduced or eliminated by the systems and methods disclosed herein. Systems, methods, devices, and non-transitory computer readable storage mediums for managing an integrated power system are disclosed herein.

In some implementations, methods are performed by a computer system having one or more processors and memory storing one or more programs executed by the one or more processors. In such methods, a total power load from an electrical power consumption entity is first determined. The electrical power consumption entity is configured to receive all or a portion of the total power load from each of (i) an alternative energy source, (ii) a power grid, and (iii) an energy storage device. The alternative energy source and the power grid are connected using a reverse power relay. Also, for a first time period, a first power supply from the alternative energy source is determined. The first power supply from the alternative energy source is affected by, at least in part, one or more natural events (e.g., adverse weather conditions) that are uncontrolled by a user. Then, in accordance with a determination during the first time period that the power supply from the alternative energy source exceeds the power load from the electrical power consumption entity, an excess portion of the power supply from the alternative energy source is stored in the energy storage device without releasing electrical power from the alternative energy source to the power grid. Such storage is performed provided that the excess portion of the power supply from the alternative energy source does not cause the energy storage device to exceed its maximum capacity.

In some implementations, the methods also include reducing the power supply from the alternative energy source when the excess portion of the power supply from the alternative energy source exceeds the energy storage device's maximum capacity.

In some implementations, the alternative energy source comprises a plurality of photovoltaic devices and a plurality of photovoltaic inverters. Each respective photovoltaic device in the plurality of photovoltaic devices is coupled to a corresponding inverter in the plurality of photovoltaic inverters. In such implementations, reduction of the power supply comprises decoupling less than all of the inverters in the plurality of inverters.

In some implementations, the methods also include reducing the power supply from the alternative energy source when the power supply from the alternative energy source exceeds the power load from the electrical power consumption entity and the energy storage device has reached a kilowatt hour rating associated with the energy storage device.

In some implementations, the energy storage device is a rechargeable battery.

In some implementations, the methods also include, for a second time period distinct from the first time period, determining a second power supply from the alternative energy source. And, in accordance with a determination that, during the second time period, the power supply from the alternative energy source is less than the power load from the electrical power consumption entity, supplying at least a portion of the power load from the electrical power consumption entity using the energy storage device during the second time period.

In some implementations, the alternative energy source includes a renewable energy supply.

In some implementations, the alternative energy source includes one of: a photovoltaic power source, a fuel cell power source, a hydro-electric power source, a geo-thermal power source, a wind turbine, a diesel generator, and an albedo source. In some implementations, the alternative energy source includes at least two of: a photovoltaic power source, a fuel cell power source, a hydro-electric power source, a geo-thermal power source, a wind turbine, a diesel generator, and an albedo source.

In some implementations, the total power load from the electrical power consumption entity remains within a predetermined lower threshold and a predetermined upper threshold during the first time period. In some implementations, these two thresholds are close to each other, indicating that the total power load does not vary much over time.

In some implementations, the methods also include determining a total amount of power the energy storage device is configured to store during the first time period. And, when the power supply from the alternative energy source exceeds the total amount, reducing, without human intervention, supply from the alternative energy source.

In some implementations, the alternative energy source comprises an isolated power system, and the method further comprises black-starting the isolated power system using electrical power stored in the energy storage device.

In some implementations, the methods also include, in response to a predefined change of load from the electrical power consumption entity, storing electrical power in the energy storage device or releasing electrical power from the energy storage device.

In some implementations, the determining the first power supply from the alternative energy source uses a weather report for the first time period.

In some implementations, the determining a first power supply from the alternative energy source uses a historical power supply from the alternative energy source over a first historical period and a historical power supply from the alternative energy source over a historical second period.

In some implementations, the first historical period is in the range of between the past day and the past ten days, and the second historical period is in the range of between the past ten minutes and the past six hours.

In some implementations, the energy storage device is configured for storing more than 1 megawatt-hour of power.

In some implementations, the energy storage device is a lithium iron phosphate battery.

In some implementations, the electrical power consumption entity is a waste-water treatment plant, a town, a building, a city, a compound, a school, a university campus, a penitentiary, or a jail.

In some implementations, the energy storage device is capable of supporting the total power load from an electrical power consumption entity for more than a portion of a day.

A second aspect of the present disclosure provides a computer system including one or more processors, memory, and one or more programs. The one or more programs are stored in the memory and are configured to be executed by the one or more processors. The one or more programs include instructions for determining a total power load from an electrical power consumption entity. The electrical power consumption entity is configured to receive all or a portion of the total power load from each of (i) an alternative energy source, (ii) a power grid, and (iii) an energy storage device. The alternative energy source and the power grid are connected using a reverse power relay. The one or more programs also include instructions for determining, for a first time period, a first power supply from the alternative energy source. The first power supply from the alternative energy source is affected by, at least in part, one or more natural events that are uncontrolled by a user. The one or more programs also include instructions that determine that, during the first time period, the power supply from the alternative energy source exceeds the power load from the electrical power consumption entity and, at such times, storing an excess portion of the power supply from the alternative energy source in the energy storage device without releasing electrical power from the alternative energy source to the power grid. Such storage is done as long as the excess portion of the power supply from the alternative energy source is less than the energy storage device's maximum capacity.

A third aspect of the present disclosure provides a non-transitory computer readable storage medium storing one or more programs. The one or more programs include instructions for determining a total power load from an electrical power consumption entity. The electrical power consumption entity is configured to receive all or a portion of the total power load from each of (i) an alternative energy source, (ii) a power grid, and (iii) an energy storage device. The alternative energy source and the power grid are connected using a reverse power relay. The one or more programs also include instructions for determining, for a first time period, a first power supply from the alternative energy source. The first power supply from the alternative energy source is affected by, at least in part, one or more natural events that are uncontrolled by a user. The one or more programs also include instructions that determined that, during the first time period, the power supply from the alternative energy source exceeds the power load from the electrical power consumption entity. At such times an excess portion of the power supply from the alternative energy source is stored in the energy storage device without releasing electrical power from the alternative energy source to the power grid. Such storage is done provided that the excess portion of the power supply from the alternative energy source does not cause the energy storage device to exceed the energy storage device's maximum capacity.

BRIEF DESCRIPTION OF THE DRAWINGS

The implementations disclosed herein are illustrated by way of example, and not by way of limitation, in the figures of the accompanying drawings. Like reference numerals refer to corresponding parts throughout the drawings.

DETAILED DESCRIPTION

Additional details of implementations are now described in relation to the Figures.

Figure 1:
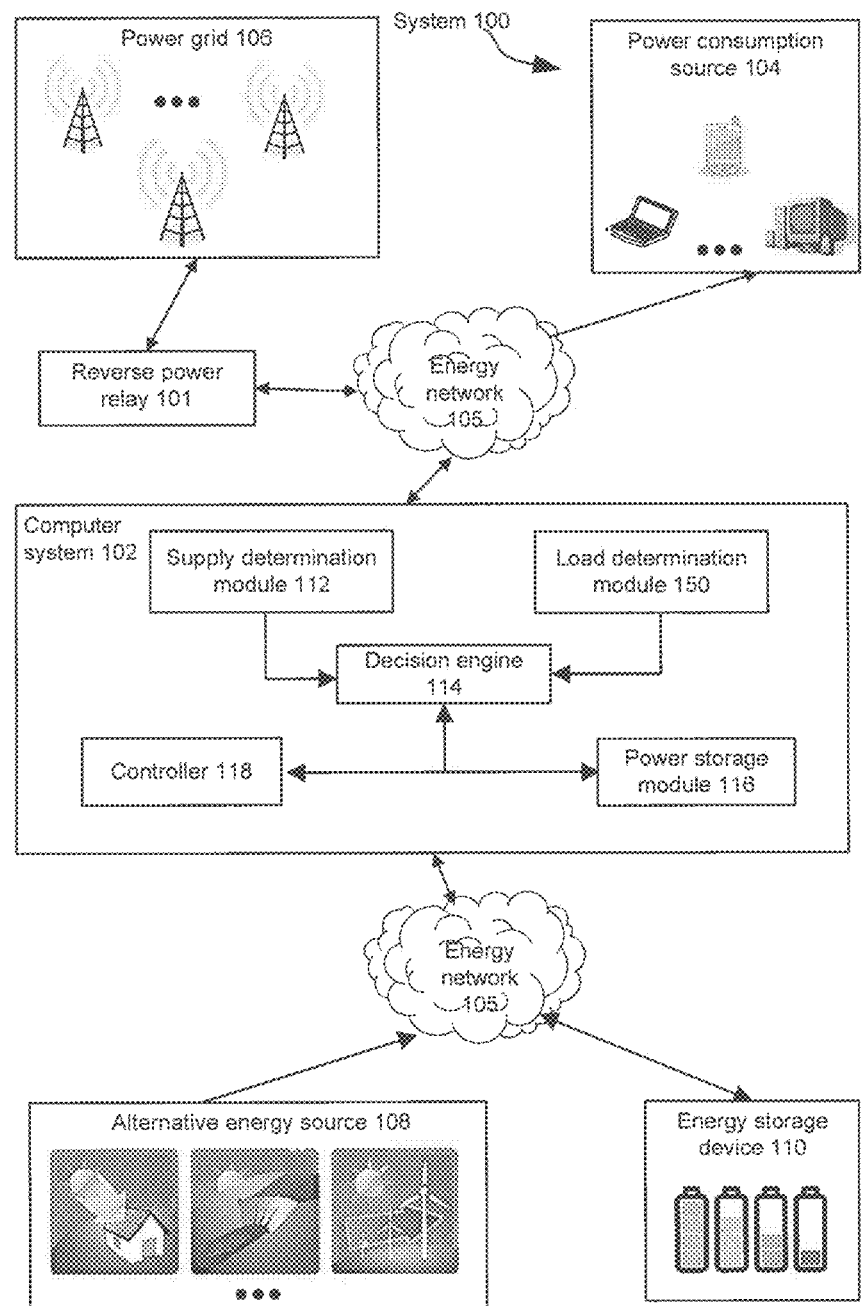
FIG. 1 is a block diagram illustrating a power system, in accordance with some implementations.

FIG. 1 is a block diagram illustrating a system 100 for regulating an alternative energy source that is decoupled from a power grid. In some implementations, the system 100 includes a computer system 102, one or more power consumption entities 104, a power grid 106, an alternative energy source 108, an energy storage device 110, and one or more energy networks 105 for interconnecting these components. In some implementations, the system 100 also includes a reverse power relay 101 for preventing a reverse power flow from the alternative energy source 108 to the power grid 106.

In some implementations, the computer system 102 includes a load determination module 150, a supply determination module 112, a decision engine 114, a power storage module 116, and a controller 118. In some implementations, the computer system 102 measures or predicts power load from one or more power consumption entities 104, as well as potential power supply from the alternative energy source 108. In some implementations, the computer system 102, based on the predicted supply and load, stores excess power supply from the alternative energy source 108 to the energy storage device 110, as well as adjusts power product by the alternative energy source 108.

In some implementations, the computer system 102, based on the predicted supply and load, releases electrical power (e.g., electricity) stored in the energy storage device 110 for consumption by the power consumption entities 104, during a power shortage—e.g., when power supply by the alternative energy source 108 fails to meet power demand by the power consumption entities 104.

In some implementations, the computer system 102 is a distributed energy resources management system (DERMS) that controls the operation of distributed energy resources (DERs)—e.g., the power grid 106, the alternative energy source 108, and an advanced energy storage (AES), which includes the energy storage device 110. In some implementations, the computer system 102 operates to optimize energy production and consumption within a power system.

In some implementations, the one or more power consumption entities 104 includes structures and equipment that consume power (e.g., electricity power), e.g., water treatment facilities, single-family houses, condominiums, city libraries, town halls, computers, heaters, air conditioners, home appliances, industrial equipment, lights, and automatic doors.

In some implementations, the power grid 106 provides electrical power supplied by a utility provider, such as the PG&E company, the California ISO company, the PJM Interconnection company, and the EDISON company.

In some implementations, the alternative energy source 108 includes one or more alternative energy supplies, such as photovoltaic farms, hydro-electric stations, wind farms/turbines, geysers, biomass plants, and/or geothermal generators.

In some implementations, the energy storage device 110, sometimes also called advanced energy storage "AES", includes a predefined number of individual batteries, e.g., a battery pool having 400 individual batteries, or a battery rack including 2,000 batteries. In some implementations, the energy storage device 110 is capable of providing 4 megawatt hours of electricity. In some implementations, the energy storage device is configured for storing more than 1 megawatt-hour of power. In some implementations, the energy storage device 110 includes a lithium iron phosphate rechargeable battery.

In some implementations, the energy network 105 includes power lines, transmission towers, power switches, or a subset thereof, for electrical power transmission and storage. In some implementations, the energy network 105 optionally includes a computer network for transmitting control signals, e.g., between the computer system 102 and the power grid 106, or between the off-grid power supply 108 and the computer system 102. In some implementations, the energy network 105 includes the Internet, one or more local area networks (LANs), one or more wide area networks (WANs), other types of networks, or a combination of such networks.

Figure 2:
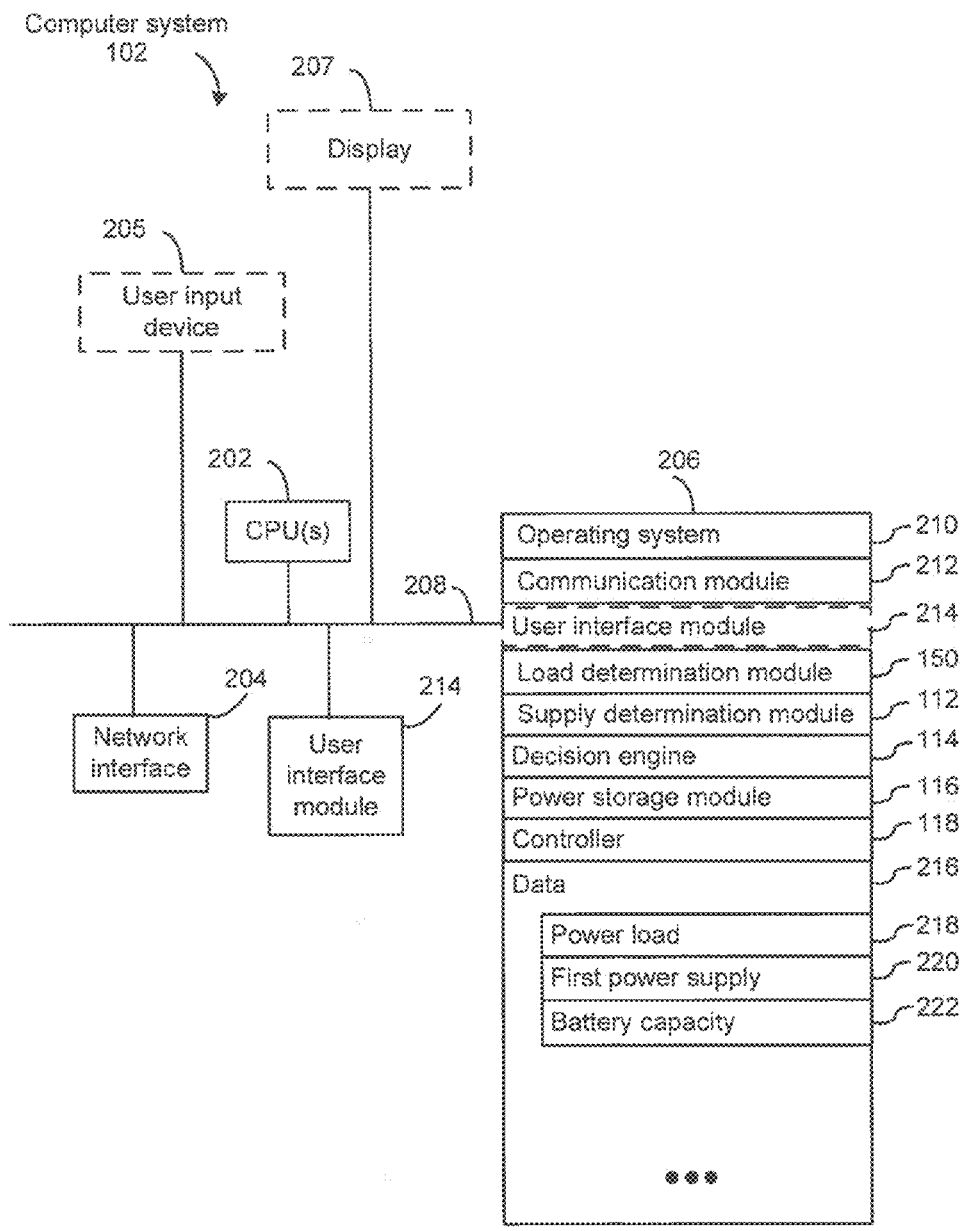
FIG. 2 is block diagram illustrating example configurations of a computer system, in accordance with some implementations.

FIG. 2 is block diagram illustrating example configurations of a computer system 102 for regulating an alternative energy source that is decoupled from a power grid, in accordance with some implementations.

The computer system 102, in some implementations, includes one or more processing units CPU(s) 202 (also herein referred to as processors), one or more network interfaces 204, one or more user input devices 205, memory 206, a display 207, and one or more communication buses 208 for interconnecting these components. The communication buses 208 optionally include circuitry (sometimes called a chipset) that interconnects and controls communications between system components. The memory 206 typically includes high-speed random access memory, such as DRAM, SRAM, or other random access solid state memory devices; and optionally includes non-volatile memory, such as one or more magnetic disk storage devices, optical disk storage devices, flash memory devices, or other non-volatile solid state storage devices. The memory 206 optionally includes one or more storage devices remotely located from the CPU(s) 202. The memory 206, or alternatively the non-volatile memory device(s) within the memory 206, comprises a non-transitory computer readable storage medium. In some implementations, the memory 206 or alternatively the non-transitory computer readable storage medium stores the following programs, modules and data structures, or a subset thereof:

an operating system 210, which includes procedures for handling various basic system services and for performing hardware dependent tasks;

a network communication module (or instructions) 212 for connecting the computer system 102 with other components in the system 100 (e.g., a computing device controlling the power grid 106 or an electrical power switch to turn on/off power supply from the alternative energy source 108) via one or more network interfaces 204 (wired or wireless), or via the energy network 105 (FIG. 1);

optionally, a user interface module 214 for displaying different user interface control, for obtaining user input, and for generating control signals in accordance therewith to control the system 100 (FIG. 1);

a load determination module 150 for measuring and predicting power load (demand) from the one or more power consumption entities 104 over a predefined time period (e.g., a prospective time period);

a supply determination module 112 for measuring and predicting supply from the alternative energy source 108 over the same predefined (e.g., prospective) time period;

a decision engine 114 for controlling operations of the alternative energy source 108 as well as that of the energy storage device 110;

a power storage module 114 for determining information relating to storing electrical power into or releasing electrical power from the energy storage device 110 (e.g., an amount of power to be stored in the battery, a timing thereof, a manner thereof, and subsequent transmission thereof, e.g., to which power consumption entity electricity is transmitted); and a controller (also called AES controller) 118 for adjusting power production by the alternative energy source 108; and data 216 stored on the computer system 102, which include:

a power load (demand) 218, which represents an estimated or predicted amount of energy, e.g., electricity, one or more power consumption entities are to consume, during a prospective time period (e.g., the next week or three hours from the current time);

a first power supply 220, which represents an estimated or predicted amount of energy an alternative energy source (e.g., a wind farm) is to provide, during a different or the same prospective time period (e.g., how many megawatt-hours electricity a wind turbine at downtown "Windy City"—Chicago—will produce, during the next week or during the next 6 hours); and a battery capacity 222, which represents an estimated or predicted amount of energy the energy storage device 110 can store, during a different or the same prospective time period.

In some implementations, the one or more user input devices 205 include a microphone (e.g., for voice control), a keyboard, a mouse, a touchscreen, and/or a trackpad. In some implementations, the display 207 includes a computer monitor and, optionally, a touchscreen.

The computer system 102, in some implementations, is implemented at a desktop computer. In other implementations, the computer system 102 is implemented at a mobile computing device, e.g., a smart phone, an APPLE IPAD or IPHONE, a hand-held device, such as a field testing device.

In some implementations, one or more of the above identified elements are stored in one or more of the previously mentioned memory devices, and correspond to a set of instructions for performing a function described above. The above identified modules or programs (e.g., sets of instructions) need not be implemented as separate software programs, procedures or modules, and thus various subsets of these modules may be combined or otherwise re-arranged in various implementations. In some implementations, the memory 206 optionally stores a subset of the modules and data structures identified above. Furthermore, the memory 206 may store additional modules and data structures not described above.

Figure 3:
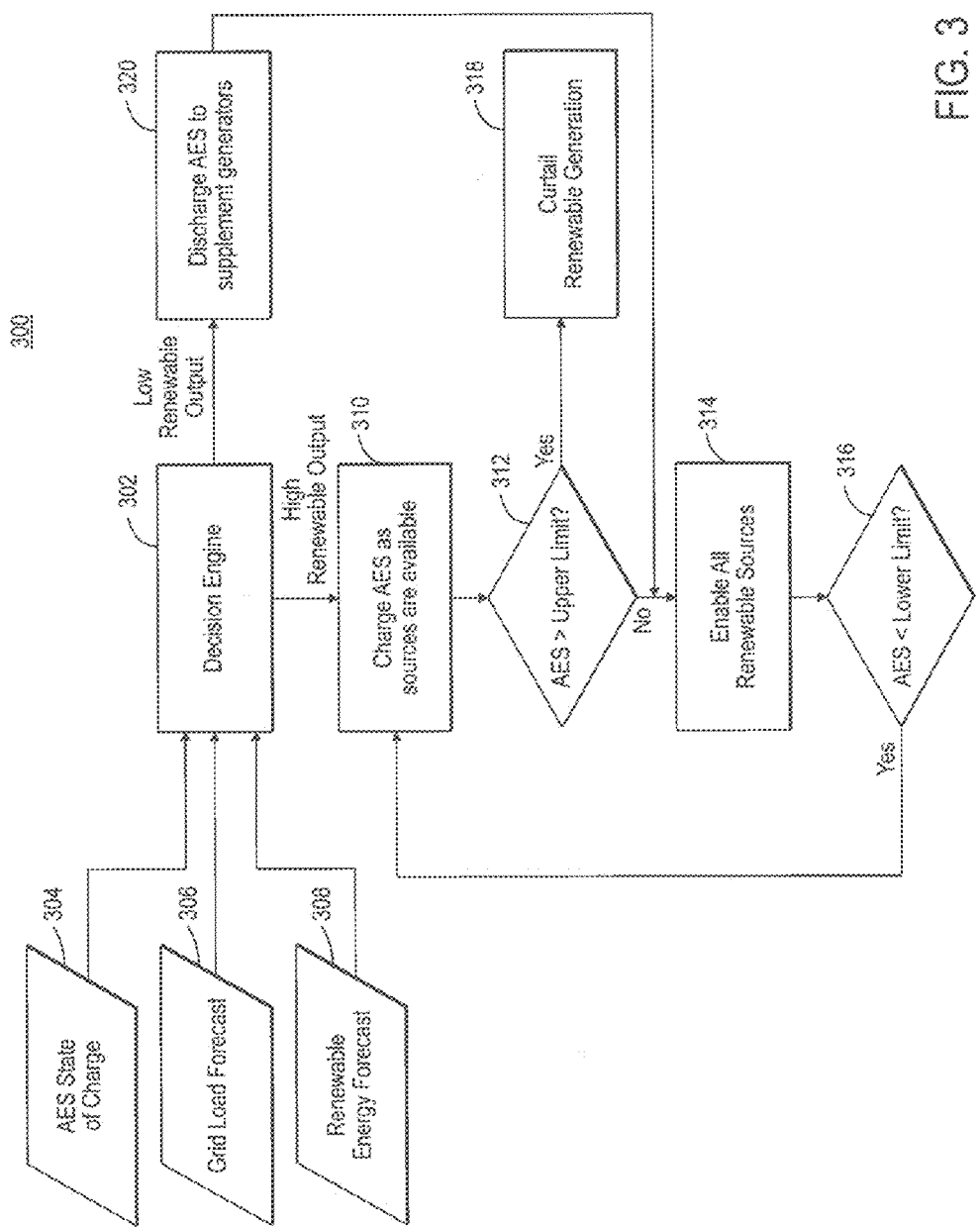
FIG. 3 is a flow chart illustrating a method for regulating an alternative energy source that is decoupled from a power grid, in accordance with some implementations.

FIG. 3 is a flow chart illustrating a method 300 for regulating an alternative energy source that is decoupled from a power grid, e.g., implemented at the computer system 102, in accordance with some implementations.

In some implementations, a decision engine 302 (e.g., a software application running on the computer system 102) first obtains an energy storage device status, load (or demand) forecast, and power production forecast, from a rechargeable energy storage device 304, one or more power consumption entities 306, and an alternative energy source 308 (e.g., a renewable energy source), respectively.

In some implementations, when power supply by the renewable energy source (e.g., a photovoltaic farm, sometimes also called a PV farm) exceeds load (or demand) by the power consumption entities (as indicated by "High Renewable Output" in FIG. 3), the decision engine charges (310) the rechargeable energy storage device to store excess power supply.

In some implementations, when the excess power supply exceeds the maximum capacity of the rechargeable battery (312) (e.g., when "AES>Upper Limit" is "Yes"), power supply by the renewable energy source is curtailed (or reduced) 318, e.g., half of the solar panels at the PV farm are shut off to reduce energy production.

In some implementations, when the excess power supply is less than the maximum capacity of the rechargeable battery (e.g., when "AES>Upper Limit" is "No")—in other words, all excess power supply can be stored in the rechargeable battery—the decision engine enables (314) all (e.g., more) available renewable energy sources, to increase power production from the renewable energy sources. For example, to take advantage of a rarely seen sunny weather, all solar panels at a photovoltaic farm located in downtown Seattle, Wash. are switched into full production mode.

In some implementations, when power storage in the rechargeable battery is less than a predefined amount (e.g., when "AES<Lower Limit" is "Yes" 316)—in other words, the rechargeable energy storage device ought to be charged—the decision engine charges (310) the rechargeable energy storage device using power supply from available sources (e.g., a power grid or the renewable energy source).

In some implementations, when the power supply by the renewable energy source is deficient (e.g., less than the power load/demand) (as indicated by "Low Renewable Output" in FIG. 3), the decision engine discharges (320) electricity stored in the rechargeable battery to remedy the deficiency.

Figure 4:
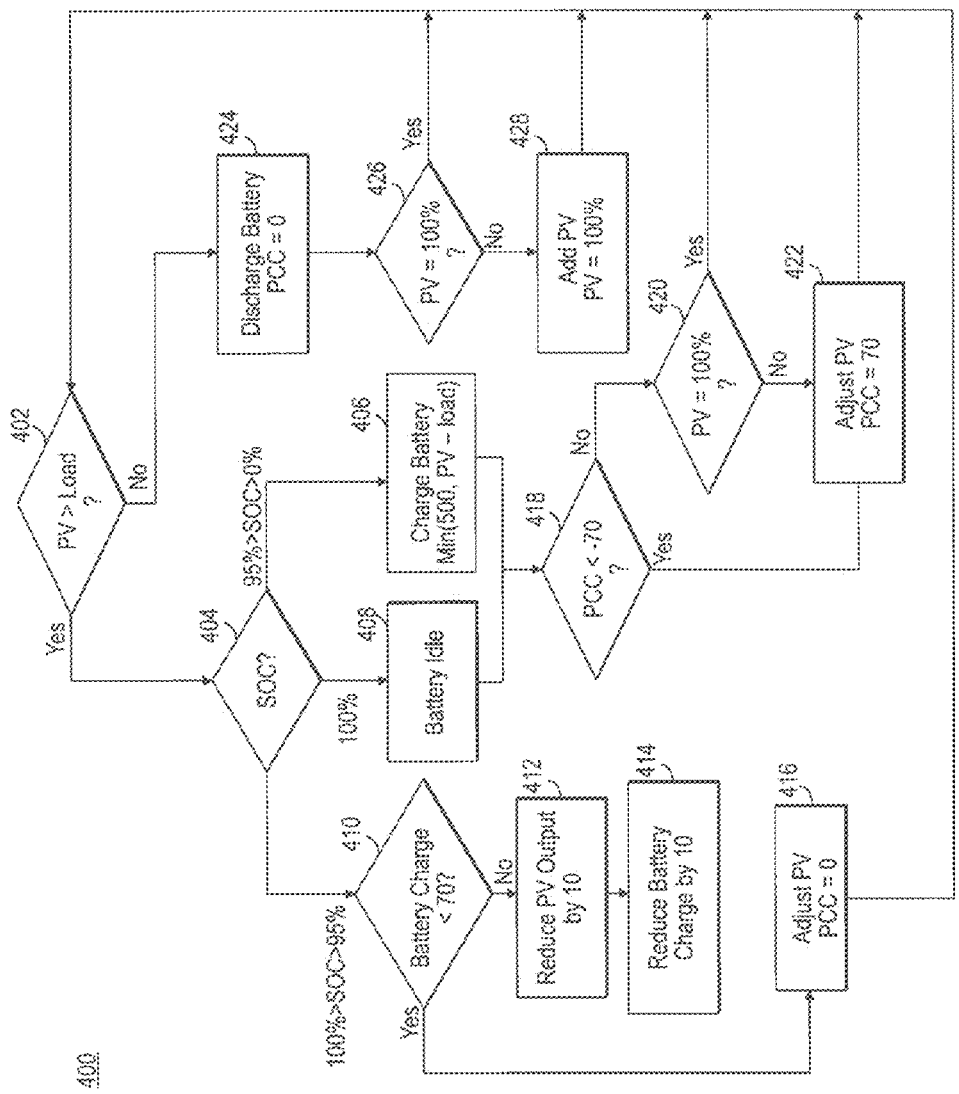
FIG. 4 is a diagram illustrating a method for regulating an alternative energy source that is decoupled from a power grid, in accordance with some implementations.

FIG. 4 is a flow chart illustrating a method 400 for regulating an alternative energy source that is decoupled from a power grid, e.g., implemented at the computer system 102, in accordance with some implementations.

As shown in FIG. 4, in a power system, the computer system first determines (402) (or predicts) power supply from a photovoltaic farm for a predefined time period (e.g., the next 3 hours). If the power supply from the photovoltaic farm is more than power load (demand), the computer system further determines (404) a state of charge for a rechargeable battery.

If the energy storage device is between 0% and 95% charged, the computer system charges (406) the energy storage device with excess power supply from the photovoltaic farm. If the rechargeable energy storage device is fully (100%) charged, the computer system does not charge the energy storage device (e.g., rechargeable battery) with excess power supply from the photovoltaic farm, but lets the battery idle (408).

Under either situation—when the energy storage device is between 0% and 95% charged or 100% charged—the computer system determines whether electricity import from a power grid is less than 70 kilowatt-hours (418).

If the electricity import is more than 70 kilowatt-hours, and photovoltaic power production is at full production rate (or speed) (420), the computer system considers that the power system is in an optimal operation mode, and waits until next future time period to check photovoltaic production and power load (402).

If the electricity import is more than 70 kilowatt-hours, and photovoltaic power production is not at full production rate, the computer system increases photovoltaic power output, so as to decrease the electricity import from the power grid to 70 kilowatt-hours (422). In practice, this involves coupling more of the inventors associated with the photovoltaic cells in the photovoltaic farm so that more of the photovoltaic devices are contributing power.

If the electricity import is less than 70 kilowatt-hours, the computer system adjusts the PV farm, and increases the electricity import from the power grid to 70 kilowatt-hours (422), e.g., when an import of 70 kilowatt per hour from the power grid is necessary to maintain balance of the power system.

Alternatively, if the rechargeable energy storage device is between 100% and 95% charged, the computer system further determines (410) whether electricity stored in the battery is less than 70 kilowatt-hours.

If the electricity stored in the energy storage device is more than 70 kilowatt-hours, the computer system reduces (412) the photovoltaic output by 10 kilowatts per hour, reduces (414) electricity stored in the energy storage device by 10 kilowatt-hours, and adjusts the photovoltaic source as needed such that electricity import from the power grid is kept (416) at a minimum, e.g., so as to keep energy costs down. Alternatively, if the electricity stored in the energy storage device is less than 70 kilowatt-hours, the computer system adjusts (e.g., increase) the photovoltaic output, such that the electricity import from a power grid is kept at a minimum (416).

Alternatively, if the power supply from the photovoltaic farm is less than the power load (demand), the computer system discharges electricity from the energy storage device to remedy the deficiency. To make up the deficiency, the computer system increases the current photovoltaic farm production rate to the full production rate (e.g., photovoltaic=100%) (426) or add more photovoltaic power sources (e.g., more solar panels) and also operates the newly—added photovoltaic power sources at full production rate (428).

Figure 5A:
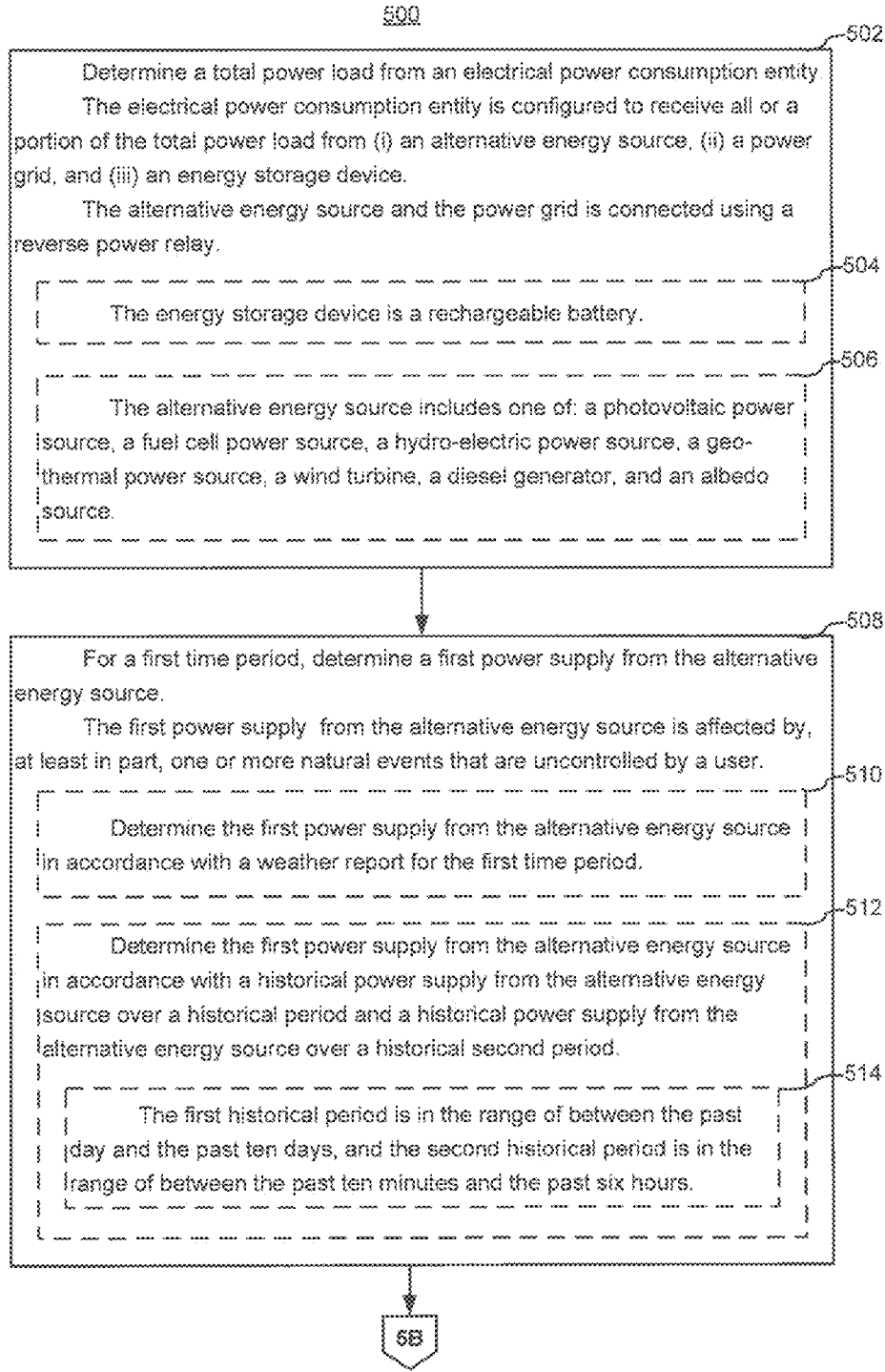
FIGS. 5A-5C are flow charts illustrating a method for regulating an alternative energy source that is decoupled from a power grid, in accordance with some implementations
Figure 5B:
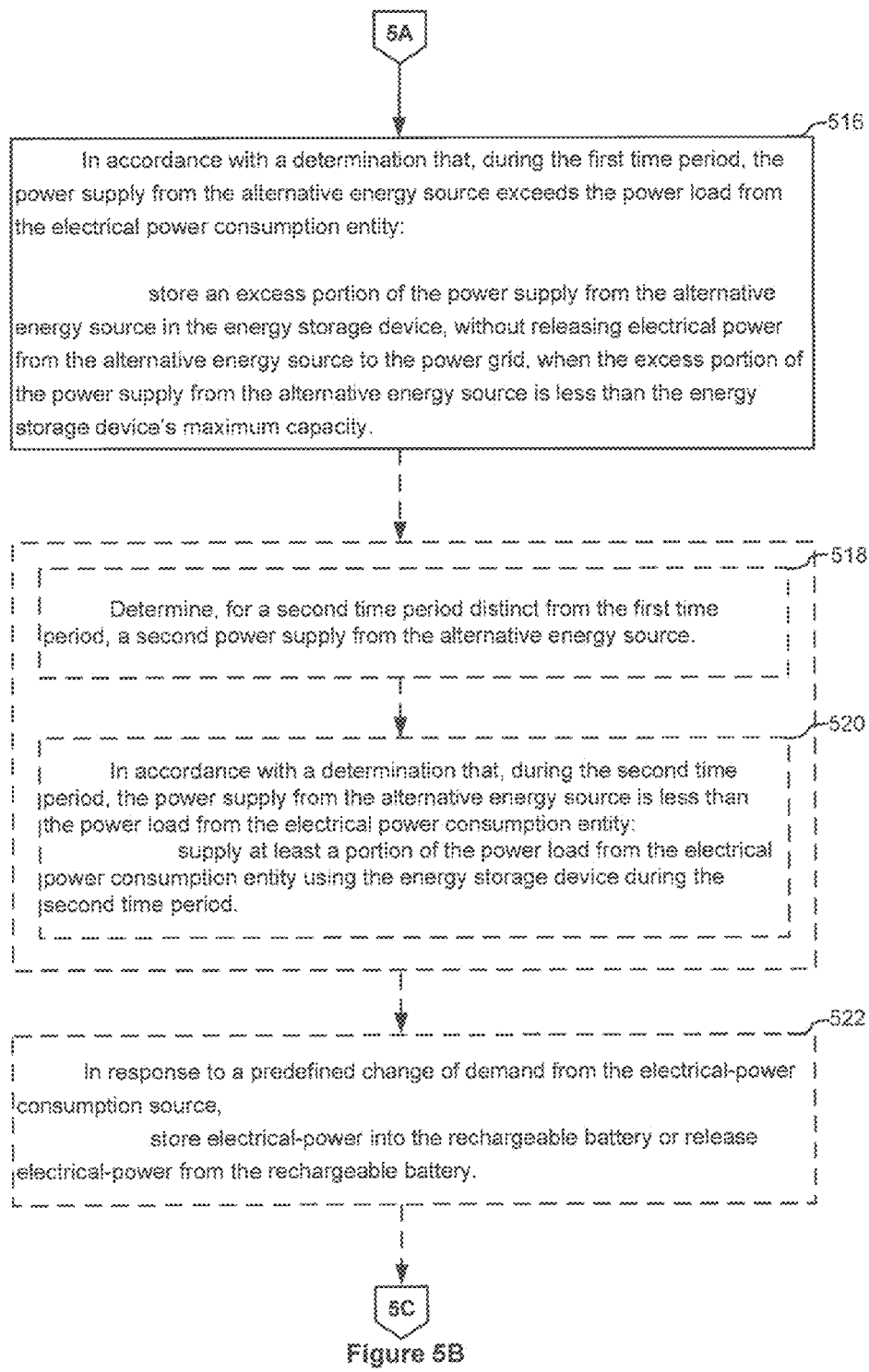
Figure 5C:
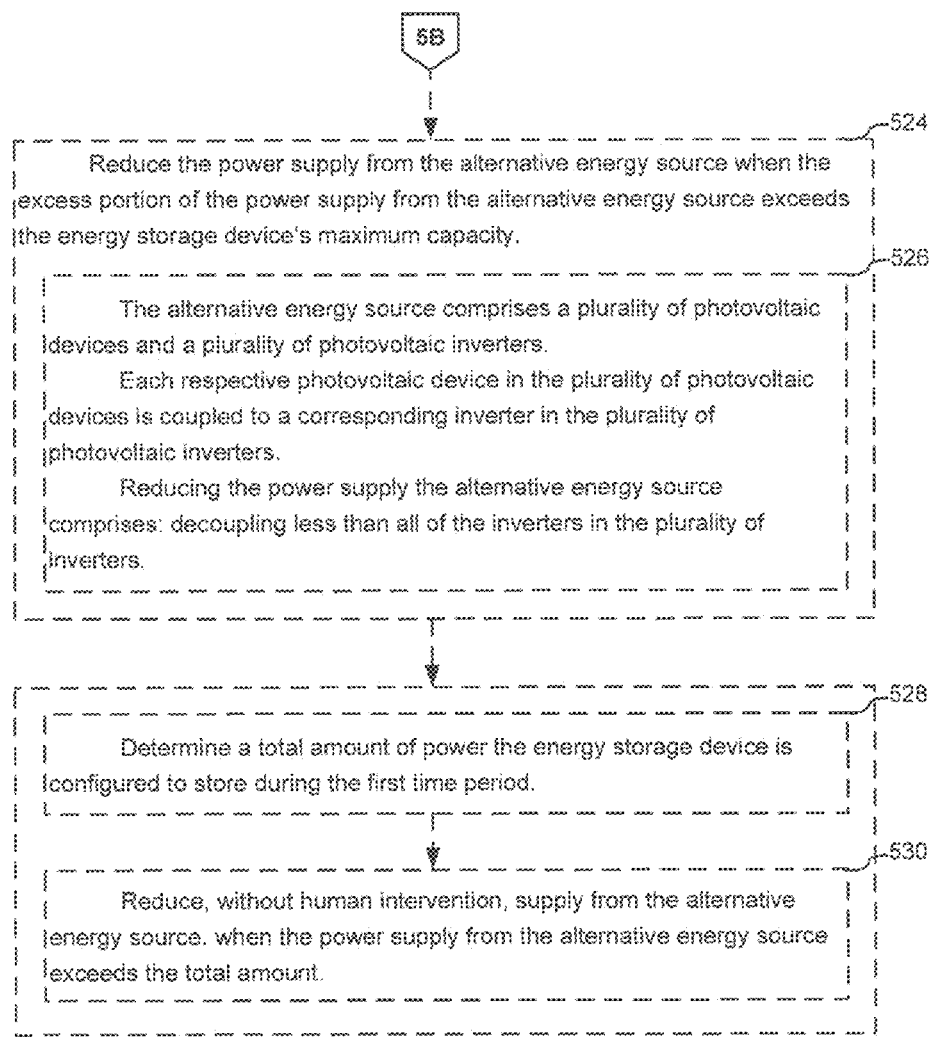

FIGS. 5A-5C are flow charts illustrating a method 500, e.g., implemented at the computer system 102, for regulating an alternative energy source that is decoupled from a power grid, in accordance with some implementations.

In some implementations, a computer system first determines (502) a total power load from an electrical power consumption entity. In some implementations, the electrical power consumption entity is a water treatment facility, a town, a building, a city, a compound, a school, a university campus, a penitentiary, or a jail.

In some implementations, the electrical power consumption entity is configured to receive all or a portion of the total power load from each of (i) an alternative energy source (e.g., a PV farm or a geo-thermal power station), (ii) a power grid (e.g., a PG&E power grid), and (iii) an energy storage device (e.g., a rechargeable battery).

In some implementations, the alternative energy source and the power grid are connected using a reverse power relay (e.g., the reverse power replay 101 in FIG. 1). In some implementations, the reverse power relay is a directional power relay that monitors power flow between the power grid and the alternative energy source, and prevents a reverse power condition in which power flows from alternative energy source into the power grid. These approaches are advantageous. Often times, a utility provider transmitting electricity using a power grid does not permit power produced by an outside source to flow into the power grid, which could cause system failure to the power grid.

In some implementations, the energy storage device (e.g., the energy storage device 110 in FIG. 1) is a rechargeable battery (504). In some implementations, the rechargeable battery includes a predefined number of individual batteries, e.g., a battery pool having 400 individual batteries, or a battery rack including 2,000 batteries. In some implementations, the rechargeable battery 110 is capable of providing 4 megawatt-hours of electricity. In some implementations, the rechargeable battery is configured to store more than 1 megawatt-hour of power. In some implementations, the rechargeable battery is a lithium iron phosphate battery.

In some implementations, the alternative energy source includes a renewable energy supply, e.g., so as to comply with relevant environmental regulations or to provide green or low carbon emission energy supply. In some implementations, the alternative energy source includes (506) power supply from one of: a photovoltaic power source, a fuel cell power source, a geyser, a wind turbine, a hydro-electric station, a nuclear power source, a geothermal power source, a fuel cell power source, a tidal power source, or an albedo power source. In some implementations, the alternative energy source includes power supply from two or more of: a photovoltaic power source, a fuel cell power source, a hydro-electric power source, a geo-thermal power source, a wind turbine, a diesel generator, or an albedo source.

In some implementations, the computer system also determines (508), for a first time period, a first power supply from the alternative energy source. The first power supply from the alternative energy source is affected by, at least in part, one or more natural events that are uncontrolled by a user.

For example, when the alternative energy source includes a wind turbine, the amount of electricity the alternative energy source produces during a summer season is affected by the wind turbine's operational time (e.g., a maximum number of hours a turbine can continuously operate without malfunctioning). For instance, the amount of electricity the alternative energy source produces during the month of February is affected by a likelihood that a newly-elected president will order a shutdown of nuclear stations that have been in service for longer than 10 year, when the alternative energy source includes such a nuclear station.

In some implementations, the computer system determines (510) the first power supply from the alternative energy source in accordance with (e.g., using) a weather report for the first time period. For instance, when the alternative energy source includes a photovoltaic component (e.g., a photovoltaic farm) and indications of inclement weather in a weather report (e.g., a NASA weather forecast) are used to downgrade expected power contributions from the photovoltaic component.

In some implementations, the computer system determines (512) a first power supply from the alternative energy source in accordance with (i) a historical power supply from the alternative energy source over a first historical period (e.g., yesterday), and (ii) a historical power supply from the alternative energy source over a second historical period (e.g., the day before yesterday). For example, power production data from two weeks ago as well as those from three weeks ago by a wind farm are used (e.g., averaged or calculated using a differential equation) to determine (e.g., predict or estimate) the wind farm's power production tomorrow.

In some implementations, the first historical period is in the range of between the past day and the past ten days; and the historical second period is in the range of between the past ten minutes and the past six hours (514), e.g., so as to determine, more accurately, the power supply from the alternative energy source, because as also noted elsewhere in the present disclosure, predictions (or estimations of future events) using data from immediate past (e.g., last 2 hours) tend to be more accurate than those using data from remote past (e.g., 20 years ago).

In some implementations, in accordance with a determination that, during the first time period, the power supply from the alternative energy source exceeds the power load from the electrical power consumption entity: the computer system stores (516) an excess portion of the power supply from the alternative energy source in the energy storage device, without releasing electrical power from the alternative energy source to the power grid, when the excess portion of the power supply from the alternative energy source is less than the energy storage device's maximum capacity.

For instance, after analyzing power consumption data, power production data, and battery status, received from a water treatment facility (also the only power consumption) on an island, a PV farm on the island, and a rechargeable battery electrically connected with the PV farm, respectively, the computer system determines (i) that the water treatment facility will consume 0.5 megawatt during the next hour, (ii) that the PV farm will produce 1.5 megawatts, during the next hour; and (iii) that the rechargeable battery can store up to 2 megawatt hours during the next hour.

Under these circumstances, when the supply (e.g., 1.5 megawatt-hours) from the photovoltaic farm exceeds the demand by the water treatment facility (and with no other power consumption, e.g., a residential area, available at the time), the computer system stores (516) an excess portion of the power supply (1 megawatt-hour, 1.5 megawatt-hours supply minus 0.5 megawatt demand) from the PV farm in the rechargeable battery, without releasing electrical power from the PV farm to the power grid, because the excess portion of the power supply (1 megawatt-hour) from the alternative energy source is less than the energy storage device's maximum capacity (2 megawatt-hours).

In some implementations, the excess portion of the power supply (1 megawatt-hour) from the alternative energy source cannot be sent back to the power grid, because, as noted above, power grid owners (e.g., utility providers) often do not accept reverse power flows.

In some implementations, when the excess portion of the power supply exceeds the maximum capacity of the energy storage device (e.g., when the excess portion is 1 megawatt-hour, and a rechargeable battery can store only up to 0.5 megawatt-hour), an amount up to the energy storage device's maximum capacity is stored, so as not to damage the energy storage device, and a request to reduce power supply is sent to the alternative energy source, e.g., so as to avoiding continuously generating excessive amount power, which can cause electrical failure to the consumption entity or to the alternative energy source.

In some implementations, the computer system additionally determines (518) a second power supply from the alternative energy source for a second time period distinct from the first time period. And in accordance with a determination that, during the second time period, the power supply from the alternative energy source is less than the power load from the electrical power consumption entity, the computer system supplies (520) at least a portion of the power load from the electrical power consumption entity using the energy storage device during the second time period.

For example, when, during a different time period (e.g., the day after tomorrow), the computer system determines that a power shortage at a photovoltaic farm is likely (because according to a FOX NEWS weather forecast, the day after tomorrow is foggy), the computer system supplies electricity stored in the rechargeable battery to power consumption entities, thereby providing relief during a power shortage.

In some implementations, in response to a predefined change of load from the electrical power consumption entity, the computer system stores (522) electrical power into the rechargeable battery or release electrical power from the rechargeable battery. For example, if a demand from a residential area exceeds a predefined rate of increase (e.g., after a large number of air conditioners are turned on), electricity stored in the rechargeable battery is released to meet the demand, when a power grid alone is unable to meet such a rapid rate of load increase.

In some implementations, the computer system reduces (524) the power supply from the alternative energy source when the excess portion of the power supply from the alternative energy source exceeds the energy storage device's maximum capacity. For example, when excess power production by a photovoltaic farm exceeds the total amount of electricity a rechargeable battery can store, the computer system reduces production at the photovoltaic farm, e.g., by turning off a certain number solar panels, so as not to damage the battery.

In some implementations, the computer system reduces the power supply from the alternative energy source when speed of power production by the alternative energy source exceeds the energy storage device's maximum charge rate. For example, due to a clear weather, a photovoltaic farm is producing electricity at a rate of 20 kilowatts per hour, while the maximum charge rate for a rechargeable battery is only 10 kilowatts per hour, the computer system reduces the rate of production at the photovoltaic farm, e.g., by adjusting angles of several solar panels, so as to avoid excessive power production.

In some implementations, the alternative energy source (e.g., a photovoltaic farm) comprises (526) a plurality of photovoltaic devices (e.g., solar panels) and a plurality of photovoltaic inverters. Each respective photovoltaic device (e.g., solar panel) in the plurality of photovoltaic devices is coupled to a corresponding inverter in the plurality of photovoltaic inverters. The computer system reduces the power supply by: decoupling less than all of the inverters in the plurality of inverters. For example, when a photovoltaic farm includes 20 solar panels, each of which is connected to an inverter, the computer system reduces power supply by the photovoltaic farm by shutting off some solar inverters, thereby controlling power production by the photovoltaic farm.

In some implementations, the computer system reduces the power supply from the alternative energy source when the power supply from the alternative energy source exceeds the power load from the electrical power consumption entity, and the energy storage device has reached a kilowatt hour rating associated with the energy storage device. For example, after a cloud disappears, a photovoltaic farm at a water treatment facility begins to produce electricity at a rate of 50 kilowatts per hour, even if the facility consumes electricity only at a rate of 20 kilowatts per hour, and a rechargeable battery has reached its full charge capacity. Under these circumstances, the computer system slows down or shut off power production by the photovoltaic farm, so as to avoid causing a power system breakdown, which can occur when electricity supply exceeds electricity demand.

In some implementations, the total power load from the electrical power consumption entity remains within a predetermined lower threshold (e.g., 3.5 megawatt hours) and a predetermined upper threshold (e.g., 4 megawatt hours) during the first time period. In some implementations, the demand or load from the electrical power consumption entity does not fluctuate more than a predefined threshold (e.g., the difference between the maximum load and the minimum load is less than 1 megawatt hour) or remains constant (e.g., no fluctuation at all). In some implementations, the electrical power consumption entity's energy or power consumption is relatively predictable, e.g., yearly electricity consumption by a three-member family living on a farm in Oregon is usually between 1 to 1.2 megawatt hours.

In some implementations, the computer system determines (528) that a total amount of power the energy storage device is configured to store during the first time period (e.g., after requesting for battery status check, the computer system determines that the battery can store an additional 0.5 megawatt hour). In some implementations, after such a determination (528), the computer system reduces (530), without human intervention, supply from the alternative energy source, when the power supply from the alternative energy source exceeds the total amount.

For instance, after determining that a battery can store an additional 0.5 megawatt during the next hour, the computer system determines that, due to an expected clear weather and strong sunlight, a photovoltaic farm will produce, during the next hour, 1.5 megawatts. Under these circumstances, because the supply (e.g., 1.5 megawatt-hours) from the PV farm exceeds the total amount of electricity the battery can store (e.g., 0.5 megawatt-hour), the computer system automatically reduces power supply from the photovoltaic farm, e.g., by sending a control signal to the PV farm to curtail its power production rate (e.g., turning solar panels away from sunlight, or shutting down inverters connected to the solar panels). These approaches are advantageous, because alternative energy sources are more affected by unpredictable events (e.g., unexpected high wind or flood conditions), and thus monitoring power supply from the alternative energy sources ought to be instantaneous, or damages may result.

In some implementations, the alternative energy source comprises an isolated power system, and the computer system black-starts the isolated power system using electrical power stored in the energy storage device. In some implementations, the computer system black-starts an isolated power system (e.g., a power system of the FUJI Island) using electrical power stored in the rechargeable battery. For example, electricity stored in the rechargeable battery is used to restart power generation (e.g., diesel generators) at a water treatment facility in the Nevada desert after a blackout.

In some implementations, the energy storage device (e.g., a rechargeable battery included therein) is capable of supporting the total power load from an electrical power consumption entity for more than a portion of a day. For example, after fully charged, the rechargeable battery 110 can support the operation of a waste water management facility for at least 3 hours, e.g., in the event of an unexpected power outage. In another example, the rechargeable battery 110 ought to support the operation of a county jail for at least 10 minutes, after which the county jail's emergency power generators will reach full capacity.

Plural instances may be provided for components, operations or structures described herein as a single instance. Finally, boundaries between various components, operations, and data stores are somewhat arbitrary, and particular operations are illustrated in the context of specific illustrative configurations. Other allocations of functionality are envisioned and may fall within the scope of the implementation(s). In general, structures and functionality presented as separate components in the example configurations may be implemented as a combined structure or component. Similarly, structures and functionality presented as a single component may be implemented as separate components. These and other variations, modifications, additions, and improvements fall within the scope of the implementation(s).

It will also be understood that, although the terms "first," "second," etc. may be used herein to describe various elements, these elements should not be limited by these terms. These terms are only used to distinguish one element from another. For example, a first time period could be termed a second time period, and, similarly, a second time period could be termed a first time period, which changing the meaning of the description, so long as all occurrences of the "first time period" are renamed consistently and all occurrences of the "second time period" are renamed consistently. The first time period, and the second time period are both time periods, but they are not the same time period.

The terminology used herein is for the purpose of describing particular implementations only and is not intended to be limiting of the claims. As used in the description of the implementations and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

As used herein, the term "if" may be construed to mean "when" or "upon" or "in response to determining" or "in accordance with a determination" or "in response to detecting," that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

The foregoing description included example systems, methods, techniques, instruction sequences, and computing machine program products that embody illustrative implementations. For purposes of explanation, numerous specific details were set forth in order to provide an understanding of various implementations of the inventive subject matter. It will be evident, however, to those skilled in the art that implementations of the inventive subject matter may be practiced without these specific details. In general, well-known instruction instances, protocols, structures and techniques have not been shown in detail.

The foregoing description, for purpose of explanation, has been described with reference to specific implementations. However, the illustrative discussions above are not intended to be exhaustive or to limit the implementations to the precise forms disclosed. Many modifications and variations are possible in view of the above teachings. The implementations were chosen and described in order to best explain the principles and their practical applications, to thereby enable others skilled in the art to best utilize the implementations and various implementations with various modifications as are suited to the particular use contemplated.

What is claimed is:

1. A method, comprising:
   at a computer system having one or more processors and memory storing one or more programs executed by the one or more processors:
   determining a total power load from an electrical power consumption entity, wherein the electrical power consumption entity is configured to receive all or a portion of the total power load from each of (i) an alternative energy source, (ii) a power grid, and (iii) a rechargeable energy storage device, and wherein the alternative energy source and the power grid are connected using a reverse power relay for preventing a reverse power flow from the alternative energy source to the power grid;
   for a first time period, determining a first power supply from the alternative energy source, wherein the first power supply from the alternative energy source is affected by, at least in part, one or more natural events that are uncontrolled by a user, and determining a second power supply from the power grid;

in accordance with a determination that, during the first time period, the second power supply from the power grid is more than a predetermined kilowatt hour rating, wherein the predetermined kilowatt hour rating is greater than 0, and a determination that the first power supply from the alternative energy source is not at a full power production level, increasing the power supply from the alternative energy source;

in accordance with a determination that, during the first time period, the second power supply from the power grid is less than the predetermined kilowatt hour rating, increasing the second power supply from the power grid; and in accordance with a determination that, during the first time period, the first power supply from the alternative energy source exceeds the power load from the electrical power consumption entity:

storing an excess portion of the first power supply from the alternative energy source in the rechargeable energy storage device, without releasing electrical power from the alternative energy source to the power grid, when the excess portion of the first power supply from the alternative energy source is less than the rechargeable energy storage device's maximum capacity; and reducing the first power supply from the alternative energy source when the excess portion of the first power supply from the alternative energy source exceeds the rechargeable energy storage device's maximum capacity, without releasing electrical power from the alternative energy source to the power grid, wherein the reduced first power supply is greater than 0.

2. The method of claim 1, wherein the alternative energy source comprises a plurality of photovoltaic devices and a plurality of photovoltaic inverters; wherein each respective photovoltaic device in the plurality of photovoltaic devices is coupled to a corresponding inverter in the plurality of photovoltaic inverters; and wherein the reducing the power supply comprises: decoupling less than all of the inverters in the plurality of inverters.

3. The method of claim 2, the method further comprising: reducing the power supply from the alternative energy source when the power supply from the alternative energy source exceeds the power load from the electrical power consumption entity, and the rechargeable energy storage device has reached a kilowatt hour rating associated with the rechargeable energy storage device.

4. The method of claim 1, wherein the energy storage device is a rechargeable battery.

5. The method of claim 1, further comprising:
for a second time period distinct from the first time period, determining a third power supply from the alternative energy source;
in accordance with a determination that, during the second time period, the power supply from the alternative energy source is less than the power load from the electrical power consumption entity:
supplying at least a portion of the power load from the electrical power consumption entity using the rechargeable energy storage device during the second time period.

6. The method of claim 1, wherein the alternative energy source includes a renewable energy supply.

7. The method of claim 1, wherein the alternative energy source includes one of: a photovoltaic power source, a fuel cell power source, a hydro-electric power source, a geo-thermal power source, a wind turbine, a diesel generator, and an albedo source.

8. The method of claim 1, wherein the alternative energy source includes at least two of: a photovoltaic power source, a fuel cell power source, a hydro-electric power source, a geo-thermal power source, a wind turbine, a diesel generator, and an albedo source.

9. The method of claim 1, wherein the total power load from the electrical power consumption entity remains within a predetermined lower threshold and a predetermined upper threshold during the first time period.

10. The method of claim 1, further comprising:
determining a total amount of power the rechargeable energy storage device is configured to store during the first time period; and
when the power supply from the alternative energy source exceeds the total amount, reducing, without human intervention, supply from the alternative energy source.

11. The method of claim 1, wherein the alternative energy source comprises an isolated power system, and further comprising black-starting the isolated power system using electrical power stored in the rechargeable energy storage device.

12. The method of claim 1, further comprising, in response to a predefined change of load from the electrical power consumption entity, storing electrical power in the rechargeable energy storage device or releasing electrical power from the rechargeable energy storage device.

13. The method of claim 1, wherein the determining the first power supply from the alternative energy source uses a weather report for the first time period.

14. The method of claim 1, wherein the determining a first power supply from the alternative energy source uses a historical power supply from the alternative energy source over a first historical period and a historical power supply from the alternative energy source over a second historical period.

15. The method of claim 14, wherein the first historical period is in the range of between the past day and the past ten days and the second historical period is in the range of between the past ten minutes and the past six hours.

16. The method of claim 1, wherein the rechargeable energy storage device is configured for storing more than 1 megawatt-hour of power.

17. The method of claim 1, wherein the rechargeable energy storage device is a lithium iron phosphate battery.

18. The method of claim 1, wherein the electrical power consumption entity is a waste-water treatment plant, a town, a building, a city, a compound, a school, a university campus, a penitentiary, or a jail.

19. The method of claim 1, wherein the rechargeable energy storage device is capable of supporting the total power load from an electrical power consumption entity for more than a portion of a day.

20. A computer system, comprising:
one or more processors;
memory; and
one or more programs, wherein the one or more programs are stored in the memory and configured to be executed by the one or more processors, the one or more programs including instructions for:

determining a total power load from an electrical power consumption entity, wherein the electrical power consumption entity is configured to receive all or a portion of the total power load from each of (i) an alternative energy source, (ii) a power grid, and (iii) an rechargeable energy storage device, and wherein the alternative energy source and the power grid is connected using a reverse power relay for preventing a reverse power flow from the alternative energy source to the power grid;

for a first time period, determining a first power supply from the alternative energy source, wherein the first power supply from the alternative energy source is affected by, at least in part, one or more natural events that are uncontrolled by a user, and determining a second power supply from the power grid;

in accordance with a determination that, during the first time period, the second power supply from the power grid is more than a predetermined kilowatt hour rating, wherein the predetermined kilowatt hour rating is greater than 0, and a determination that the first power supply from the alternative energy source is not at a full power production level, increasing the power supply from the alternative energy source;

in accordance with a determination that, during the first time period, the second power supply from the power grid is less than the predetermined kilowatt hour rating, increasing the second power supply from the power grid; and in accordance with a determination that, during the first time period, the first power supply from the alternative energy source exceeds the power load from the electrical power consumption entity:

storing an excess portion of the first power supply from the alternative energy source in the rechargeable energy storage device, without releasing electrical power from the alternative energy source to the power grid, when the excess portion of the first power supply from the alternative energy source is less than the rechargeable energy storage device's maximum capacity; and reducing the first power supply from the alternative energy source when the excess portion of the first power supply from the alternative energy source exceeds the rechargeable energy storage device's maximum capacity, without releasing electrical power from the alternative energy source to the power grid, wherein the reduced first power supply is greater than 0.

21. A non-transitory computer readable storage medium storing one or more programs, the one or more programs comprising instructions, which when executed by a computer system with one or more processors, cause the computer system to:

determine a total power load from an electrical power consumption entity, wherein the electrical power consumption entity is configured to receive all or a portion of the total power load from each of (i) an alternative energy source, (ii) a power grid, and (iii) an rechargeable energy storage device, and wherein the alternative energy source and the power grid is connected using a reverse power relay for preventing a reverse power flow from the alternative energy source to the power grid;

for a first time period, determining a first power supply from the alternative energy source, wherein the first power supply from the alternative energy source is affected by, at least in part, one or more natural events that are uncontrolled by a user, and determining a second power supply from the power grid;

in accordance with a determination that, during the first time period, the second power supply from the power grid is more than a predetermined kilowatt hour rating, wherein the predetermined kilowatt hour rating is greater than 0, and a determination that the first power supply from the alternative energy source is not at a full power production level, increasing the power supply from the alternative energy source;

in accordance with a determination that, during the first time period, the second power supply from the power grid is less than the predetermined kilowatt hour rating, increasing the second power supply from the power grid; and in accordance with a determination that, during the first time period, the first power supply from the alternative energy source exceeds the power load from the electrical power consumption entity:

storing an excess portion of the first power supply from the alternative energy source in the rechargeable energy storage device, without releasing electrical power from the alternative energy source to the power grid, when the excess portion of the first power supply from the alternative energy source is less than the rechargeable energy storage device's maximum capacity; and reducing the first power supply from the alternative energy source when the excess portion of the first power supply from the alternative energy source exceeds the rechargeable energy storage device's maximum capacity, without releasing electrical power from the alternative energy source to the power grid, wherein the reduced first power supply is greater than 0.

* * * * *